(12) United States Patent
Voliter et al.

(10) Patent No.: US 9,280,949 B2
(45) Date of Patent: Mar. 8, 2016

(54) COLOR SELECTION INTERFACE (75) Inventors: Robert Voliter, San Jose, CA (US); Teri Pettit, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 120 days.

(21) Appl. No.: 13/181,410

(22) Filed: Jul. 12, 2011

(65) Prior Publication Data
US 2012/0007879 A1 Jan. 12, 2012

Related U.S. Application Data

(63) Continuation of application No. 11/520,872, filed on Sep. 13, 2006, now Pat. No. 8,013,869.

(51) Int. Cl.
*G09G 5/06* (2006.01)
*G06F 3/0484* (2013.01)

(52) U.S. Cl.
CPC .............. *G09G 5/06* (2013.01); *G06F 3/04845* (2013.01)

(58) Field of Classification Search
USPC .................................. 345/150, 153, 591, 593
See application file for complete search history.

(56) References Cited

U.S. PATENT DOCUMENTS

| 4,794,382 | A | * | 12/1988 | Lai et al. | 345/594 |
|---|---|---|---|---|---|
| 5,119,186 | A | * | 6/1992 | Deacon et al. | 358/524 |
| 5,233,684 | A | * | 8/1993 | Ulichney | 345/604 |
| 5,311,212 | A | * | 5/1994 | Beretta | 345/591 |
| 5,473,738 | A | * | 12/1995 | Hamlin et al. | 345/594 |
| 5,786,908 | A | * | 7/1998 | Liang | 358/518 |
| 5,803,739 | A | * | 9/1998 | Hitchcock | 434/78 |
| 5,841,439 | A | * | 11/1998 | Pose et al. | 345/418 |
| 5,889,932 | A | * | 3/1999 | Adegeest et al. | 358/1.18 |
| 5,903,255 | A | * | 5/1999 | Busch et al. | 345/594 |
| 5,909,220 | A | * | 6/1999 | Sandow | 345/589 |
| 6,081,253 | A | * | 6/2000 | Luke et al. | 345/604 |
| 6,181,445 | B1 | * | 1/2001 | Lin et al. | 358/520 |
| 6,226,010 | B1 | * | 5/2001 | Long | 345/594 |
| 6,234,801 | B1 | * | 5/2001 | Hsu | 434/98 |
| 6,301,579 | B1 | * | 10/2001 | Becker | 1/1 |
| 6,697,079 | B2 | * | 2/2004 | Rose | 345/593 |
| 6,720,973 | B2 | * | 4/2004 | Butler | 345/604 |
| 6,928,187 | B2 | * | 8/2005 | Cooper et al. | 382/167 |
| 7,136,074 | B2 | * | 11/2006 | Hussie | 345/591 |
| 7,180,524 | B1 | * | 2/2007 | Axelrod | 345/593 |
| 8,089,482 | B1 | * | 1/2012 | Axelrod | 345/440 |
| 2002/0018121 | A1 | * | 2/2002 | Fasciano | 348/179 |
| 2002/0089513 | A1 | * | 7/2002 | Blanchard et al. | 345/589 |
| 2003/0142331 | A1 | * | 7/2003 | Tanaka | 358/1.9 |
| 2003/0151531 | A1 | * | 8/2003 | Sasaki | 341/106 |

(Continued)

FOREIGN PATENT DOCUMENTS

WO  WO2005059880  *  6/2005  .............. G09G 3/28

*Primary Examiner* — Antonio Xavier
(74) *Attorney, Agent, or Firm* — Kilpatrick Townsend & Stockton LLP (57) ABSTRACT

Displaying colors in a color selection interface is disclosed. Displaying includes identifying a first plurality of colors associated with a color selection interface, mapping each color in the first plurality of colors to an allowed color in an allowed color set of one or more colors to obtain a second plurality of colors, wherein mapping is performed based at least in part on a color lookup table, and visually displaying the second plurality of colors in the color selection interface, wherein the color selection interface is configured to receive a color selection from the second plurality of colors.

23 Claims, 10 Drawing Sheets
(4 of 10 Drawing Sheet(s) Filed in Color)

(56) References Cited

U.S. PATENT DOCUMENTS

| | | | |
|---|---|---|---|
| 2003/0174882 A1* | 9/2003 | Turpin et al. | 382/162 |
| 2004/0001072 A1* | 1/2004 | Newman | 345/593 |
| 2006/0022994 A1* | 2/2006 | Hussie | 345/591 |
| 2006/0044324 A1* | 3/2006 | Shum et al. | 345/595 |
| 2006/0071938 A1* | 4/2006 | Richardson et al. | 345/591 |
| 2006/0248081 A1* | 11/2006 | Lamy | 707/7 |
| 2007/0035746 A1* | 2/2007 | Jecha et al. | 358/1.1 |
| 2007/0091337 A1* | 4/2007 | Morovic | 358/1.9 |
| 2007/0222707 A1* | 9/2007 | Thebault et al. | 345/60 |
| 2008/0062442 A1* | 3/2008 | Olson | 358/1.9 |

* cited by examiner

| R | G | B |
|---|---|---|
| 0 | 5 | 200 |
| 20 | 5 | 200 |
| 20 | 5 | 207 |
| 90 | 80 | 80 |
| 255 | 60 | 5 |
| 255 | 90 | 3 |

COLOR SELECTION INTERFACE

CROSS REFERENCE TO OTHER APPLICATIONS

This application is a continuation of co-pending U.S. patent application Ser. No. 11/520,872, entitled COLOR SELECTION INTERFACE filed Sep. 13, 2006 which is incorporated herein by reference for all purposes.

BACKGROUND OF THE INVENTION

Design and graphics related applications, such as Adobe® Illustrator®, typically provide various ways for a user to specify or otherwise select color, including text based and graphical color pickers. Examples of text based color pickers include input boxes for entering RGB (Red, Green, Blue), CMYK (Cyan, Magenta, Yellow, Black), and HSB (Hue, Saturation, Brightness) values for a particular color. Examples of graphical color pickers include color sliders, color wheels, and color grids. Color pickers typically display a continuous spectrum of colors from which a user can choose.

There are cases in which users are limited to a particular set of allowed colors due to physical or other constraints. For example, users who work in print, silk screening, and branding often must work with a particular color library comprising of a finite number of colors. A continuous spectrum color picker is less useful in that it will pick colors outside of the allowed color set. If a user uses the Pantone library, for example, the user typically must first specify a color from a continuous spectrum color picker, and then request the closest Pantone color to that color. If the returned Pantone color is not desirable to the user, the user goes back, specifies another color from the continuous spectrum color picker, and again requests the closest Pantone color to that color. This process continues until a desirable Pantone color is returned. Only one Pantone color can be requested at a time. Thus, a Pantone color is selected by trial and error, testing out a series of guesses until a desirable Pantone color is found. This process is repetitive, inefficient, and may yield a suboptimal result. For example, a frustrated user may simply make do with an unsatisfactory color rather than waste time trying to find a better color. This process is also extremely tedious when attempting to find a set of related colors within the Pantone set. Since the user is navigating the continuous spectrum of colors using a color picker the user is unable to answer questions like, "What is the next greenest Pantone color?" or "What is the next most saturated Pantone color?" Thus, improved techniques for color selection are needed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
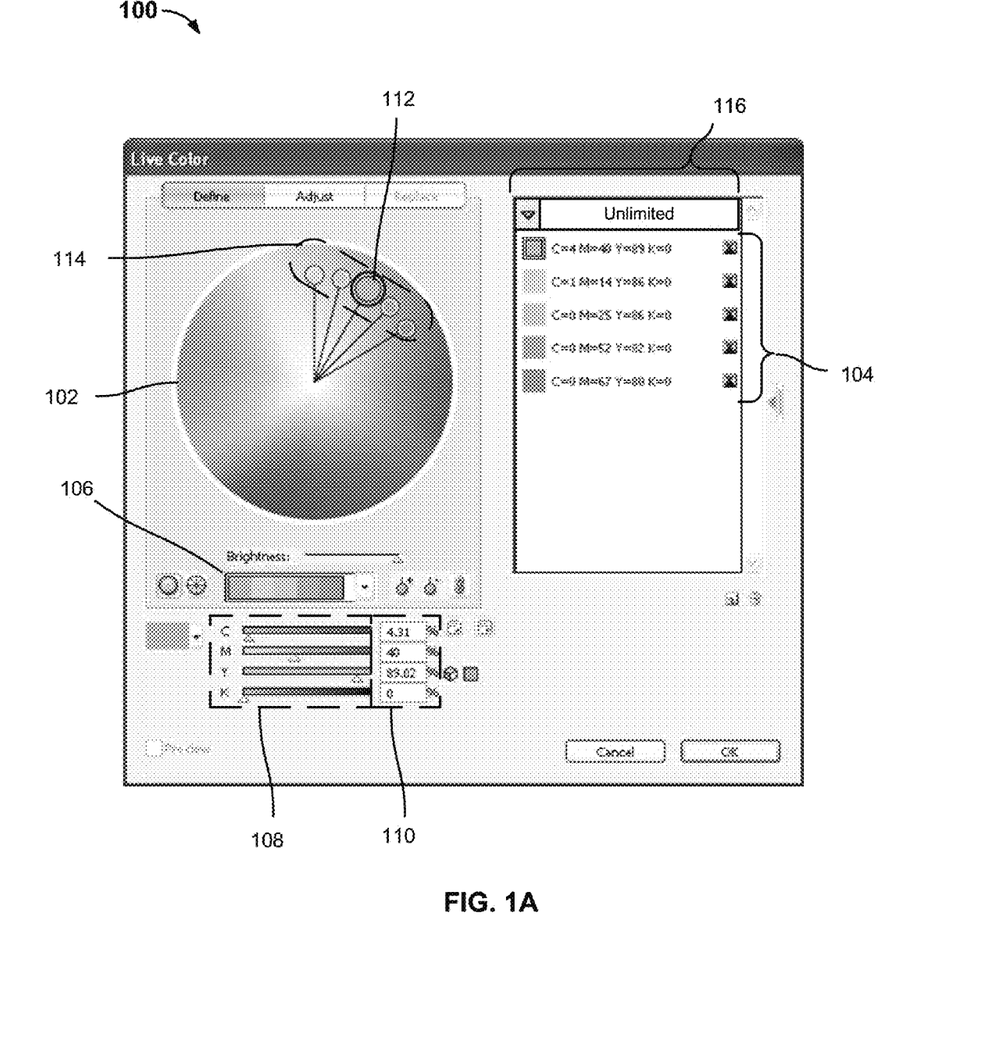
FIG. 1A illustrates an example of an interface for selecting a color.

FIG. 1A illustrates an example of an interface for selecting a color. Interface 100 is a graphical user interface (GUI) that might be presented to a user in a design or graphics application, such as Adobe® Illustrator®, Adobe® Photoshop®, ColorSchemer, ColorImpact, and Microsoft Acrylic, or any product that assigns multiple colors to art or constructs palettes of related colors. Interface 100 is shown to include a variety of color pickers.

A color picker, as used herein, refers to any object associated with an interface that may be used to select a color. Color pickers may be text based or graphical. Text based color pickers include RGB, CMYK, HSB, and Lab input boxes, in which a color is selected by entering text. Graphical color pickers can be one, two, or three dimensional (1D, 2D, or 3D), and include, for example, color wheels (3D), color grids (2D), color sliders (1D). A color grid is a 2D color picker in which a color attribute varies along each axis. A color may be selected using an input device such as a keyboard, mouse, stylus, or touchpad. For example, using a mouse, a cursor (or an eyedropper tool) for selecting a color may be moved over a color wheel until it is placed above a desired color in the color wheel. The cursor is then used to pick up the desired color and apply it to a selected object. Examples of color sliders include RGB, CMYK, HSB, and Lab sliders. Some sliders are configured to display the range of colors they can specify and they include a marker that is moved vertically or horizontally by a user where the position of the marker corresponds to a color that is previewed and (if so desired) selected by a user. The red slider in RGB, for example, shows a color with 0% red at one end of the slider and a color with 100% red on the other. The area in between displays all the other colors that can be achieved by only changing the red value. In some embodiments, a user interface includes a plurality of color pickers. For example, graphical color pickers may be displayed adjacent to a text based color picker. For example, RGB sliders may be displayed adjacent to RGB input boxes.

Interface 100 is shown to include a variety of color pickers, including color wheel 102, CMYK color sliders 108, and text input boxes 110.

Color wheel 102 shows a continuous spectrum of colors from which a color may be selected by a user. As used herein, continuous refers to the lowest level of granularity (i.e., a continuous spectrum of colors includes all colors within a given range). For example, for a continuous color slider for the color cyan, the color slider shows every possible value of cyan in the range of the slider. Color wheel 102 shows a set of encircled colors 114, where middle circle 112 indicates the selected color and the adjacent circles indicate other colors in the set. The set of colors 114 form a color harmony. Color harmonies may be derived using a color wheel in which hue varies with the angle of the wheel. In this example, the five colors are spaced by the same angle in the color wheel; in some embodiments, colors in a color harmony are not necessarily separated by equal angles. Each color in the harmony can be independently defined in terms of the selected color, for example. A user may use color harmony picker 114 to select a base color, and other colors in the color harmony are derived from it. For example, a user may select and drag circle 112 anywhere in color wheel 102 (e.g., by rotating and/or by radially extending/contracting circle 112) to select a different color. The other four circles remain at the same angles relative to circle 114 and correspond to other colors in the color harmony. With other harmony rules, the other colors may move with various degrees of freedom. A color harmony can be created by any rule that defines a set of colors in terms of another color. Fixed angles is an example of a color harmony rule.

Pull down menu 106 indicates the current color harmony. That is, after a user rotates and/or extends/contracts color harmony picker 114 or modifies the selected color, pull down menu 116 is refreshed to reflect the new color harmony. In some embodiments, menu 106 allows other color harmonies to be selected. For example, the current color harmony includes five colors spaced by approximately 15 degrees. Other color harmonies may have different angular spacing. Other color harmonies may be provided as menu items in menu 106. For example, a user may pull down menu 106 and select one of the other color harmonies to be used with color wheel 102.

Color sliders 108 show color bars for C, M, Y, and K for the selected color. Adjacent to each color bar is a text box that displays the current C, M, Y, or K value. The text box may also be used to input a C, M, Y, or K value. In some embodiments, color sliders 108 are able to receive inputs from a user. For example, a user may be able to control the color of circle 112 by sliding arrows in color sliders 108 and/or entering values into text boxes 110. The placement of color harmony 112 in some embodiments is refreshed if a user adjusts arrows in color sliders 108 and/or text boxes 110. Conversely, the values shown in text boxes 110 and/or the placement of arrows in color sliders 108 in some embodiments is refreshed if a user moves color harmony picker 112.

Window 104 shows the five colors in the current color harmony along with their CMYK values. Pull down menu 116 indicates whether the color choices are limited or constrained to an allowed color set, such as a color library. In this example, the color choices are "Unlimited." In some cases, the colors allowed in the artwork come from an allowed color set, such as a particular color library. For example, a designer may select a color library that includes colors that a certain fabric is available in.

Figure 1B:
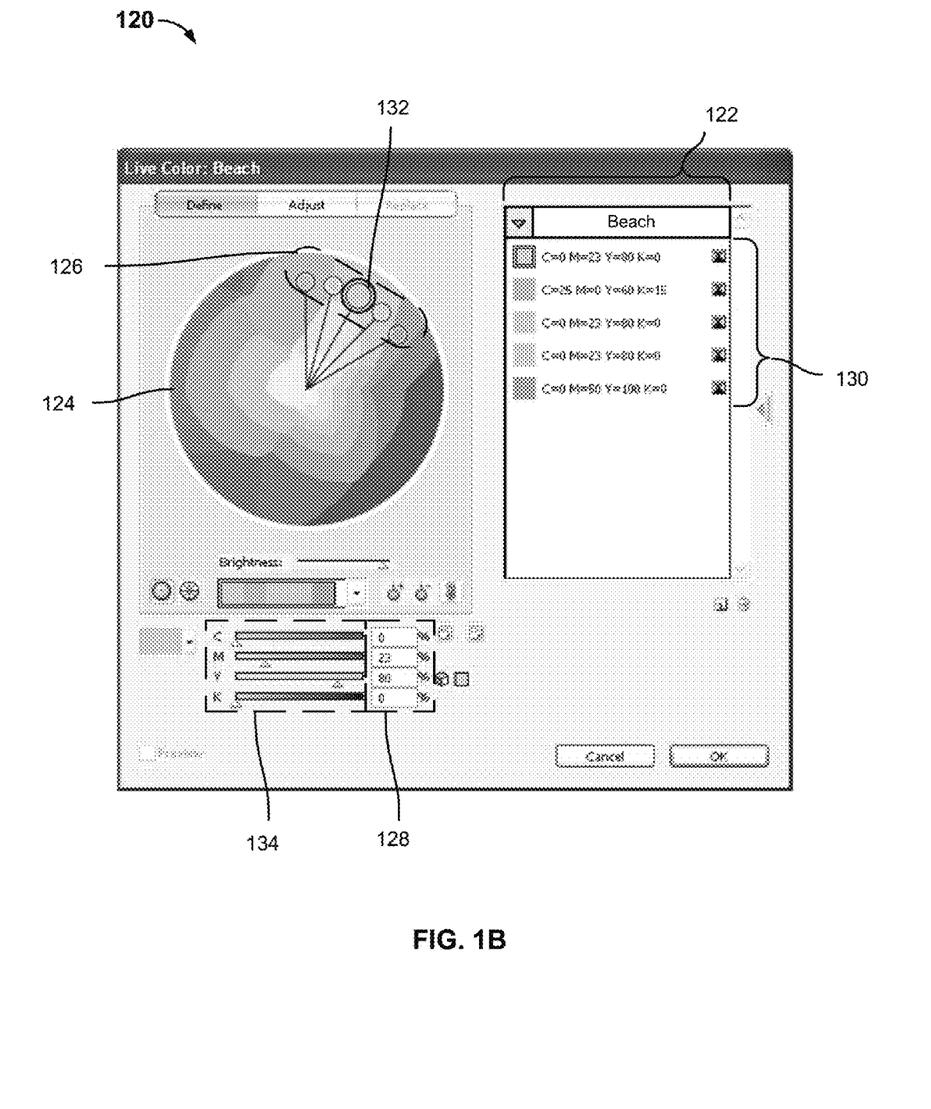
FIG. 1B illustrates an embodiment of an interface for selecting one or more colors in which the colors are limited to an allowed color set associated with a theme library.

FIG. 1B illustrates an embodiment of an interface for selecting one or more colors in which the colors are limited to an allowed color set associated with a theme library. In some embodiments, interface 120 is displayed in response to limiting the color set using menu 116 in interface 100. As shown in menu 122, the colors have been limited to the color library "Beach."

Color wheel 124 is segmented into areas corresponding to the allowed color set. Instead of a continuous spectrum of color as shown in color wheel 102, discrete sections of color corresponding to the color library "Beach" are shown. The locations or placement of each section of a permitted color reflect a color mapping between the colors in a continuous spectrum and colors in a color library (e.g., the color library "Beach"). For example, the region along the left edge of color wheel 124 is shown in a dark aqua color. Continuous spectrum colors that are located within a corresponding region in a continuous spectrum color wheel (e.g., colors along the left edge of continuous spectrum color wheel 102) map to the dark aqua color shown. In some embodiments, each pixel in color wheel 102 is mapped to a color in the Beach library to generate color wheel 124. In some embodiments, the mapped color is the closest or most similar color in the color library to the initial color. As shown, colors 114 are mapped to colors 126. The selected color, color 132, is mapped to 0% C, 23% M, 80% Y, and 0% K, as shown by text boxes 128.

Although not shown in this example, in some embodiments, color sliders 134 are segmented into discrete portions corresponding to the allowed color set (e.g., the colors in the color library "Beach").

Thus, the color selection interface only displays allowed colors so that in cases where colors must be selected from an allowed color set, a user can view colors available for selection that are part of the allowed color set. A user is also able to observe or otherwise have insight into a color mapping from a continuous spectrum of colors (e.g., shown in color wheel 102) to a set of permitted or allowed set of colors. This may be more convenient for a user since multiple colors from an allowed color set can be selected at the same time and/or a user does not have to guess or go back and forth using a color mapping tool to find an attractive or otherwise desired color from an allowed set of colors. Limiting the available colors while using the same color selection interface also allows the user to logically navigate the limited set of colors in the same manner they would navigate the continuous color spectrum. For example, the user could use the saturation slider to achieve a darker or lighter color while keeping the hue constant. This makes the slider have the same meaning of picking darker and lighter colors both in the limited color set and an in the continuous color spectrum.

In some embodiments, color pickers provide a way of displaying variations from a "current" color. The current color is different than a "selected color" as, since a "selected color" is a color a user picks from within the displayed variations, while a "current color" controls what subset of the full color space is displayed at any moment to pick from. In some embodiments, the color picker at any moment does not display the entire color space; it displays only those colors that share some dimensions. 2D displays within a color picker show a "slice" within a 3D space and are often accompanied by 1D sliders that control where that slice lies in the 3D space. For example, in an HSB space, the slider might control the brightness, with the slider's visual bar showing colors that all have the same hue and saturation as the "current color", varying from a brightness of 0% at one end to 100% at the other end, while the accompanying 2D display (either a rectangular grid or a wheel) shows all the colors that have the same brightness as the "current color", with the hue varying in one direction (either around the rim of a wheel or along one edge of a grid), and the saturation varying in the other direction (either along the radius of a wheel or along the other side of the grid.) Colors that do not share any dimension with the current color do not appear anywhere on the color picker's display, until some change is made to modify the current color.

In some embodiments, only colors from the allowed set that are near or adjacent to a desired color are displayed, allowing a user to move from color to nearby color within the allowed set in a way that is similar to navigating more continuous color spaces. By displaying adjacent colors, questions like, "What is the next greenest Pantone color?" or "What is the next most saturated Pantone color?" may be answered.

Figure 1C:
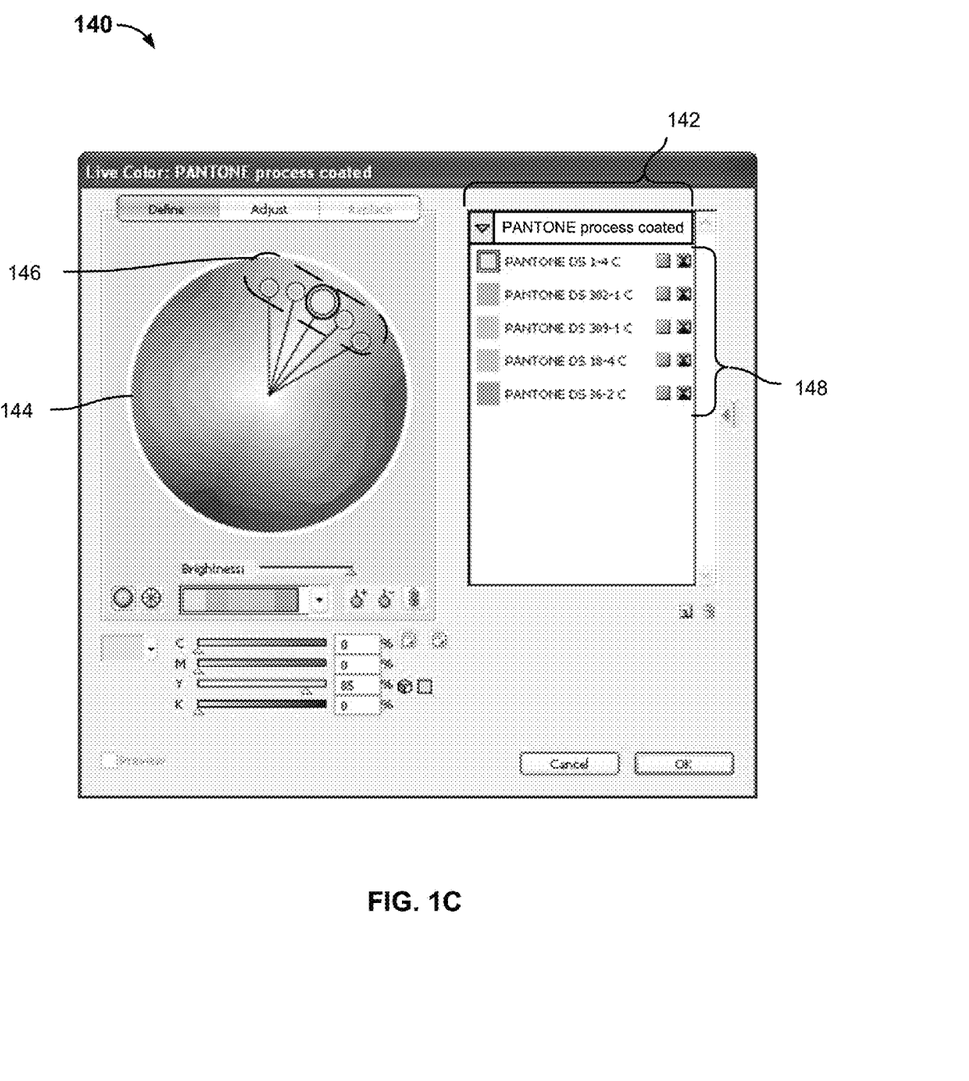
FIG. 1C illustrates an embodiment of an interface for selecting a color in which the colors are limited to an allowed color set associated with a print library.

FIG. 1C illustrates an embodiment of an interface for selecting a color in which the colors are limited to an allowed color set associated with a print library. In some embodiments, interface 140 is displayed in response to selecting a color set using menu 116 in interface 100. In some embodiments, interface 140 is displayed in response to limiting the color set using menu 122 in interface 120. As shown in menu 142, the colors have been limited to the color library "PANTONE process coated."

Color wheel 144 is segmented into discrete areas corresponding to the allowed color set. Instead of a continuous spectrum of color as shown in color wheel 102, discrete sections of color corresponding to the color library "Pantone process coated" is shown. In some embodiments, each pixel in color wheel 102 is mapped to a color in the color library "Pantone process coated" to form color wheel 144. Each color in color harmony picker 116 is mapped to a color in the color library "Pantone process coated" to obtain encircled colors 146. In some embodiments, window 148 shows the five colors in the Pantone process coated library that the original colors shown in FIG. 1A have been mapped to.

Figure 1D:
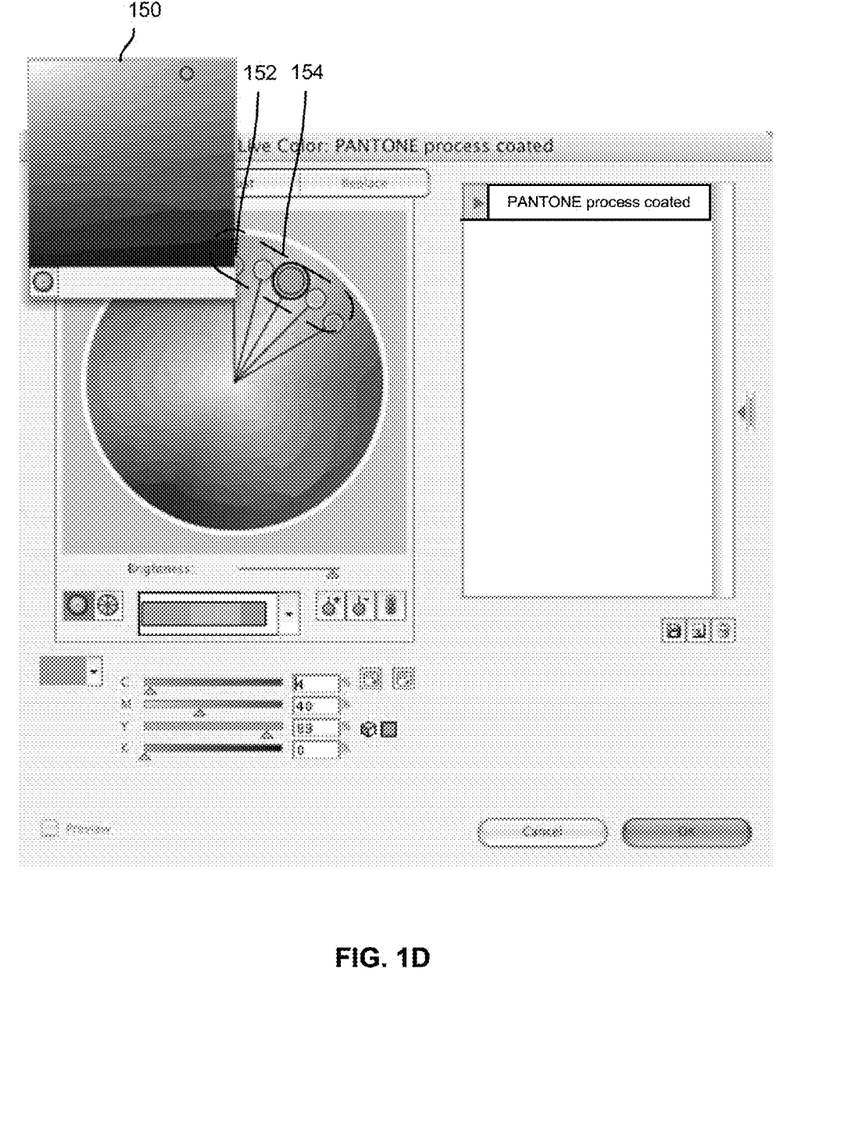
FIG. 1D illustrates an embodiment of an interface for selecting a color in which the colors are limited to an allowed color set.

FIG. 1D illustrates an embodiment of an interface for selecting a color in which the colors are limited to an allowed color set. In this example, brightness/saturation picker 150 (corresponding to color 152 in color harmony set 154) is shown. As shown, brightness/saturation picker 150 is a color grid color picker that shows discrete sections of color corresponding to the color library "PANTONE process coated." In some embodiments, picker 150 shows how color 152 varies when brightness and saturation parameters are adjusted. This example shows how color pickers can have other shapes, such as a square.

Figure 2:
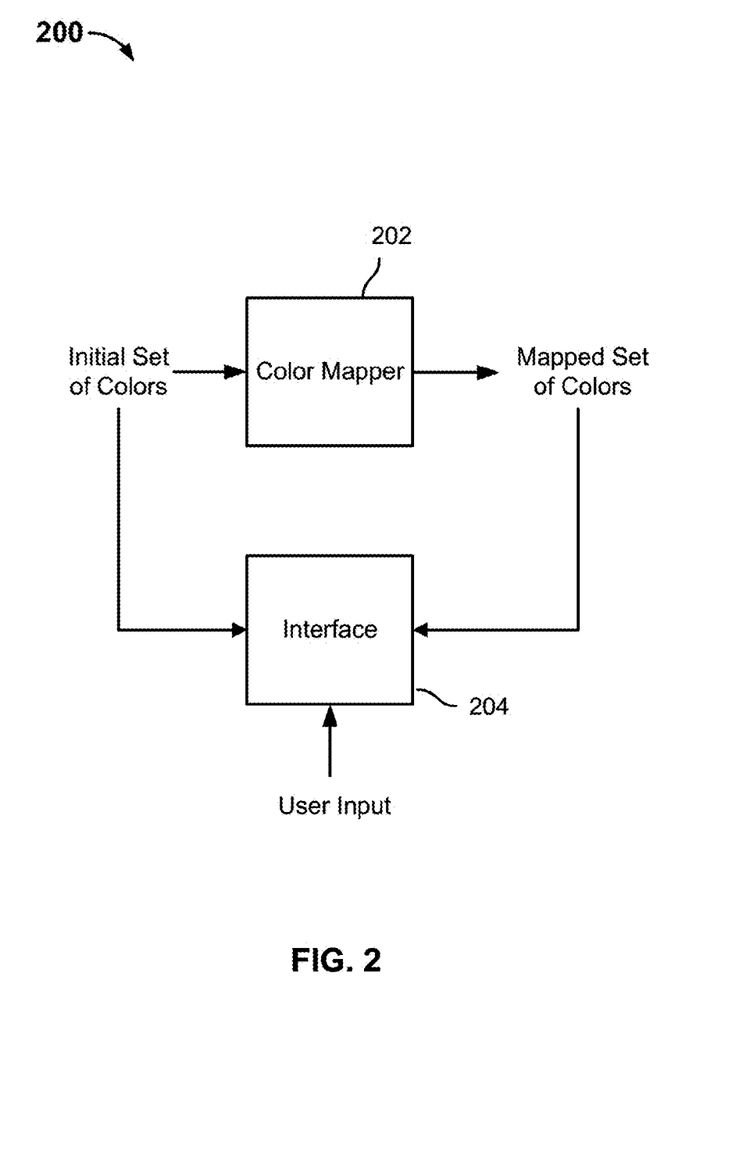
FIG. 2 is a block diagram illustrating an embodiment of a system for mapping color.

FIG. 2 is a block diagram illustrating an embodiment of a system for mapping color. In the example shown, system 200 includes color mapper 202 and interface 204. An initial set of colors is displayed via interface 204. For example, an initial set of colors are displayed in color wheel 102 in interface 100. In some embodiments, an initial set of colors is a continuous spectrum or an unconstrained set of colors within a particular range. One or more initial colors may be selected using interface 204. For example, color 112 is selected. Mapper 202 maps the initial set of colors to a mapped set of colors, which are displayed in interface 204. In some embodiments, the mapped set is a set that is limited to an allowed set of colors, such as a color library. In some embodiments, the mapped set is obtained using a mathematical function or other transform. A user can select from the mapped set of colors using interface 204. For example, mapper 202 maps the initial set of colors displayed in color wheel 132 to the set of colors displayed in color wheel 124 or any other color picker or other appropriate interface.

After mapping the colors, interface 204 displays a color picker that only shows colors from the mapped set of colors. Thus, when the colors are limited to a print library such as Pantone process coated, a color selected from the color picker is the exact color that will be printed. A user does not need to select a color from a continuous spectrum color picker, and convert the color to the nearest Pantone color to determine if it is a desirable color, before selecting the color.

In some embodiments, the allowed color set simulates colors viewable by someone with color vision deficiencies. For example, it may be useful to allow a user with normal color vision to quickly pick a set of colors which are attractive to someone with normal color vision and yet still easily discriminated by someone with color vision deficiencies.

Figure 3:
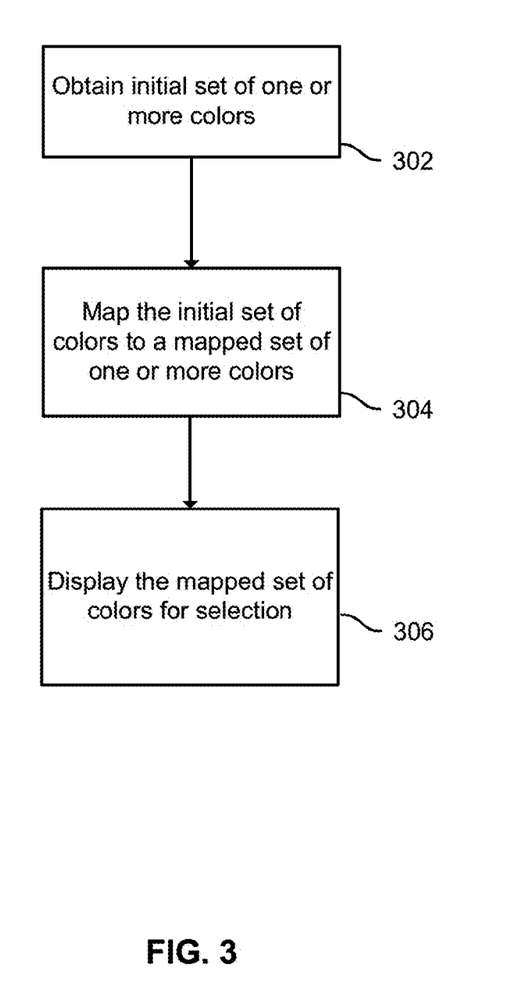
FIG. 3 is a flowchart illustrating an embodiment of a process for mapping a set of one or more unconstrained colors to a set of one or more constrained colors.

FIG. 3 is a flowchart illustrating an embodiment of a process for mapping a set of one or more unconstrained colors to a set of one or more constrained colors. For example, the example process may be used to map a continuous spectrum of colors to a color library or some other constrained set of colors. In some embodiments, this process is performed by mapper 202. An initial set of one or more colors is obtained at 302. For example, a definition, location, or reference to an initial set of colors is obtained. In some embodiments, the initial set of colors is a continuous spectrum of color. In some embodiments, the initial set of colors is a discrete set of colors.

In some embodiments, an allowed set of colors is also obtained. For example, a definition, location, or reference to an allowed set of colors is obtained. In some cases, an allowed set of colors is associated with a color library and an appropriate color library is obtained when, for example, a user selects a particular color library for use. In various embodiments, an allowed set of colors is associated with a color library, a color theme, a color palette, or any other set of colors. The allowed set of colors may be defined in a variety of ways. For example, the allowed set of colors may comprise all colors tagged "winter" in a design application or on a website. Other examples include: colors in a favorites folder or having a favorites tag, color themes or libraries associated with color themes (e.g., natural, pastel, floral themes), color libraries (e.g., Pantone process coated, Pantone metallic coated), colors that have at least 50% red, etc. In some embodiments, an interface is provided for a user to specify the allowed set of colors. In various embodiments, such an interface includes a variety of objects, such as input boxes and/or pull down menus, to specify color libraries, tags, folders, etc.

For example, a user could specify the location of a color library or a reference (e.g., pointer) to a color table associated with a color library.

At 304, the initial set of colors is mapped to a mapped set of one or more colors. In some embodiments, the mapped set of colors is a discrete set of colors from an allowed set of colors. In some embodiments, each color in the initial set of colors is mapped to a color in an allowed set of colors. In some embodiments, a mapped set of colors has a smaller or the same sized set of colors than an initial set of colors. In some embodiments, an initial set of colors has a higher level of granularity than a mapped set of colors In some embodiments, a mapped set of colors and an initial set of colors are non-overlapping (i.e., do not have a color in common). For example, if CMYK is used, each color in the initial set may be mapped to a darker color by increasing the black parameter (K).

In various embodiments, various mapping techniques may be used. For example, a mathematical function or other transform may be used to map each initial color to a color in an allowed set. In another example, a color lookup table may be used. The color lookup table includes all the colors in the allowed set. A color lookup process may be used to select a color in the lookup table corresponding to an initial color. The selected color may be the closest or most similar color in the table to the initial color, where closest or most similar may be defined in a variety of ways. For example, the closest color may be defined as the color with the smallest difference, deviation or mean squared error among one or more parameters in a color model (e.g., RGB). For example, the closest color may be defined as the color that is the closest in the R value. In another example, the closest color might be defined as the color that is closest in mean squared error across all parameters in the color model. Under this definition, in RGB, the closest color would minimize:

$$(deltaR)^2+(deltaG)^2+(deltaB)^2$$

where:
deltaR=Initial R−Allowed R
deltaG=Initial G−Allowed G
deltaB=Initial B−Allowed B Distance metrics may be weighted. For example, the closest color would minimize:

$$3*(deltaR^2)+6*(deltaG^2)+2*(deltaB^2)$$

The weighting reflects the fact that the green parameter contributes the most to the brightness or darkness of a color. Other examples of weighted distance metrics include computing the distance in Hue/Saturation/Brightness, and weighting hue more heavily in a harmony application, or weighting brightness more heavily when choosing colors that might be printed or displayed in black and white as well as well as in full color.

In various embodiments, one or more color lookup tables may be used to select the closest color. In some embodiments, a color lookup table is optimized for faster lookup. These and other techniques are more fully described below.

At 306, the mapped colors are displayed for selection. For example, the mapped colors may be displayed in a variety of color pickers, such as a color wheel, a color grid, a color slider or color bar, or any other appropriate color picker. In some embodiments, visually displaying refers to displaying the color itself, rather than numbers corresponding to the color.

In some embodiments, an initial set of colors is displayed with a mapped set of colors. This may be useful in showing a user which colors in an initial set have been mapped to a particular color in a mapped set. For example, in some embodiments, color wheel 102 is displayed next to color wheel 144 or next to color wheel 124. In some applications, this is desirable because, for example, a user may still care about an unconstrained color. For example, in some embodiments, a particular print process is used where only certain print colors are available. However, the unconstrained color is saved and may be used with a different print process (e.g., with many more colors). In this case, a user would still care what an unconstrained color is and it may be useful to show the relationship between a constrained set of colors and an unconstrained set of colors.

In some embodiments, the example process is used to map a set of colors in an artwork, such as an image, to a set of mapped colors. For example, artwork with warm colors can be mapped to artwork with cool colors or with nature colors.

Figure 4:
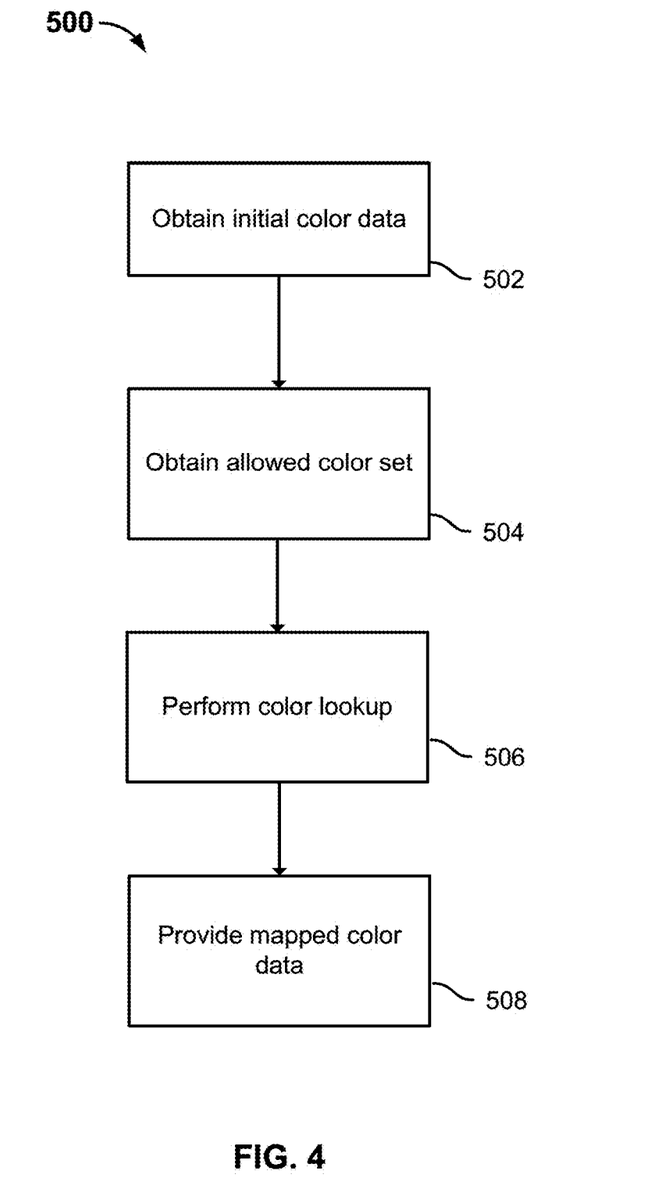
FIG. 4 is a flowchart illustrating an embodiment of performing a color lookup.

FIG. 4 is a flowchart illustrating an embodiment of performing a color lookup. In some embodiments, process 500 is performed by color lookup block 402. In some embodiments, process 500 is used to perform 302-304. In some embodiments, process 500 is repeated for each color in a color picker. In some embodiments, process 500 is repeated for each pixel used to present a color to a user. For example, the process may be performed for each pixel in continuous spectrum color wheel 102 to obtain a constrained or otherwise permitted color for each pixel in, for example, color wheel 124 or color wheel 132.

At 502, initial color data is obtained. In some embodiments, data related to a continuous set of colors from a color picker is obtained, as described above. For example, CMYK or RGB values are obtained. At 504, an allowed color set is obtained. In some embodiments, a color library or reference to a color library is obtained, as described above. For example, CMYK or RGB values corresponding to an allowed color set are obtained. At 506, color lookup is performed. In this example, a color lookup table is used. In some embodiments, performing a color lookup includes finding the closest color to an initial color in a table of allowed colors. Any appropriate technique may be used to perform color lookup, or find the closest color. In some embodiments, techniques described in U.S. Pat. No. 6,728,398 are used. U.S. Pat. No. 6,728,398 is incorporated herein by reference for all purposes. Another example is the median cut algorithm described by Paul Heckbert in "Color image quantization for frame buffer display", Proceedings of ACM SIGGRAPH 82 (also cited as Computer Graphics vol. 16, no. 3), pp. 297-307, 1982. At 508, mapped color data is provided. For example, in some embodiments, the mapped color data is passed to a process or entity associated with displaying or otherwise rendering objects on display. In some embodiments, a pixel location and a mapped color are passed to an appropriate entity associated with display so that the display entity knows what color to display a particular pixel. In some embodiments, the mapped color data includes only the information needed to display the color (e.g., the RGB value). In some embodiments, the mapped color data includes a color definition and/or an index into a color lookup table.

In some embodiments, process 500 is performed when a color is selected. This may be the case when at 508, only the information needed to display the color was previously returned, and now that the color is selected, additional information about the selected color is desired. For example, when a user selects a color using a pointing device from the mapped color picker or in some cases, from an unmapped (e.g., continuous spectrum) color picker, process 500 is performed for the color that is selected.

In some cases, a user may desire to select a color not shown by the color picker. For example, a color slider only shows a subset of the colors in the allowable set of colors because it is limited to a particular range of say, R (red) values. In some embodiments, a text input box is provided in which the user can enter parameters for a particular color, and in response, the color picker is refreshed to show the corresponding mapped color. For example, the allowable colors are the set of all colors in RGB with R values that are a multiple of 5. A color bar only shows colors in the range of R=0 to R=10, so the color bar shows three color segments corresponding to R=0, 5, and 10. A user would like to select a color outside the currently displayed range. Using an input box, the user enters R=34. R=34 maps to R=35 and the color associated with R=35 is displayed. In some embodiments, the color bar is refreshed and the color associated with R=35 is displayed at the center of the color bar so that the color bar now shows colors in the range of R=30 to R=40. In other words, three segments are shown: R=30, R=35, and R=40.

In some embodiments, multiple colors are selected, for example, when using a color harmony picker as shown in FIG. 1B. In this case, process 500 may be performed for each color in the color harmony.

In some embodiments, the initial colors and the mapped colors are both stored. This way, if a different library is selected, then the initial colors are mapped to the new library to obtain the new color wheel. Initial colors may be stored in any appropriate format and/or using any appropriate technique. For example, initial colors in some embodiments are stored as a range of initial colors.

Figure 5:
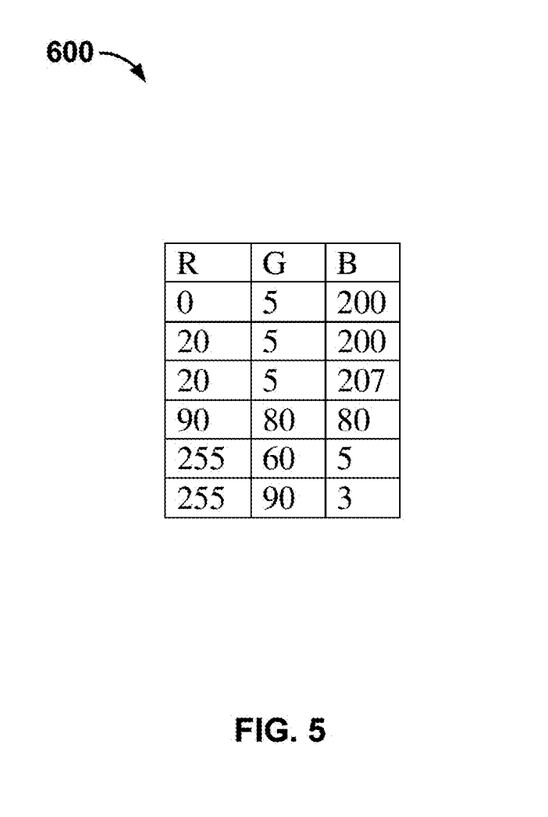
FIG. 5 is an example of a color lookup table.

FIG. 5 is an example of a color lookup table. In the example shown, color lookup table 600 is a table of allowed colors. Color lookup table 600 includes one row for each allowed color, where each row includes the RGB values for that color. Although RGB is shown, any other color model, such as CMYK, may be used in other embodiments. In this example, to facilitate color lookup, the table is sorted first by R values, then by G values, and then by B values. Other techniques to make table lookup faster can be used.

In one example, the closest color is defined as the color with the closest R value, then the closest G value, and then the closest B value. To perform a lookup for an initial color having R=240, G=56, and B=1, first the closest rows to R=240 are looked up, resulting in rows 5 and 6. Of rows 5 and 6, the closest rows to G=56 are looked up, resulting in row 5. Row 5 is selected as the closest color. A reference or pointer to row 5 and/or the color definition (RGB values) may be returned.

In another example, a nearest neighbor technique may be used. To perform a lookup for an initial color having R=240, G=56, and B=1, the initial color is placed in the color lookup table. It would be inserted in between rows 4 and 5. Between rows 4 and 5, the closest color is row 5. Therefore row 5 is returned.

A variety of color lookup techniques may be used. For example, color lookup tables may be processed in various ways for faster lookup, including sorting or organizing the tables in one or more tables or structures, using one or more hash tables, etc.

Figure 6:
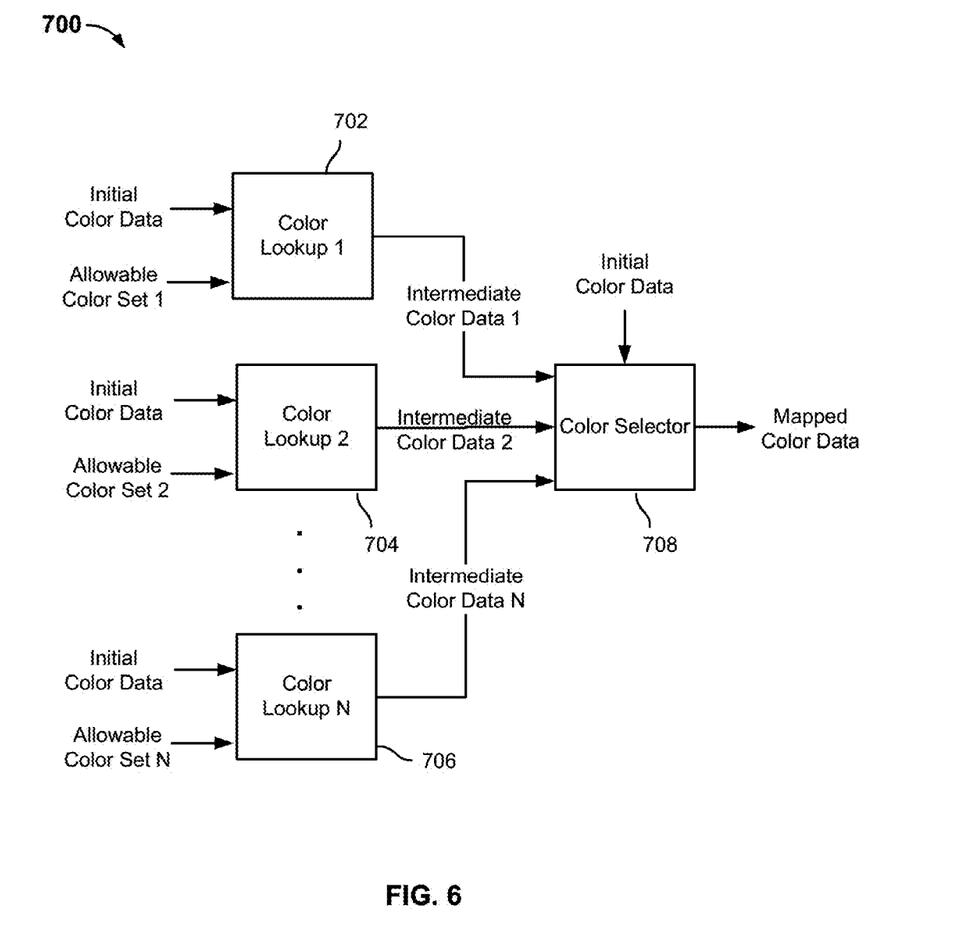
FIG. 6 is a block diagram illustrating an embodiment of a system for mapping color.

FIG. 6 is a block diagram illustrating an embodiment of a system for mapping color. In some embodiments, block 202 is implemented using system 700. In some cases, a color lookup module can only handle up to a maximum number of allowed colors. For example, some color lookup techniques were designed with particular monitors in mind that are only able to display 256 colors. In some embodiments, the example system is used to handle situations in which there are more allowed colors than a maximum that can be handled by a color lookup module. In some embodiments, rather than using a single color lookup table, the color lookup table is divided into smaller lookup tables to make processing lookups faster. For example, a large color library corresponding to a large color lookup table may be partitioned into smaller color libraries corresponding to smaller lookup tables. In this example, a color lookup table has been divided into N color lookup tables. The closest color is looked up in each table, resulting in a candidate set of closest colors, and then the closest color among the candidate set is selected.

As shown, initial color data and N allowed color sets are provided as input to system 700. For example a set of 4000 colors is divided into four sets of 1000 colors each. The sets may be divided in any appropriate way. For example, the 4000 colors may be divided such that the 1000 colors with the highest C values are in one set, the next highest C values in the next set, and so forth. In some embodiments, sets are determined in a manner to optimize or otherwise reduce the amount of time to perform color lookup. For example, if a color lookup module is able to reduce its processing time when allowed colors are spaced further apart, in some embodiments, the allowed color sets are determined or otherwise distributed so that each color lookup module has a set of allowed colors that are spaced far apart. Each allowed color set is provided as input to a corresponding color lookup block (blocks 702-706). The initial color data is also input to blocks 702-706. Each color lookup block performs a color lookup to obtain intermediate color data. Intermediate color data is output from each of blocks 702-706 and input to color selector 708. In some embodiments, intermediate color data includes color values (e.g., RGB or CMYK values); in some embodiments intermediate color data includes a reference or pointer to an entry in a color lookup table. The initial color data is also input to color selector 708. Color selector 708 selects a color from the intermediate color data and outputs it as mapped color data.

In various embodiments, any number of stages may be used. For example, multiple stages of color lookups can be performed, where each stage narrows the candidate set further.

Using multiple lookup tables may be useful in cases in which an existing lookup block is available, where the lookup block can lookup up to a certain number of colors. To perform a color lookup for a library having a greater number of colors, multiple existing lookup blocks may be used as described in this example.

Figure 7:
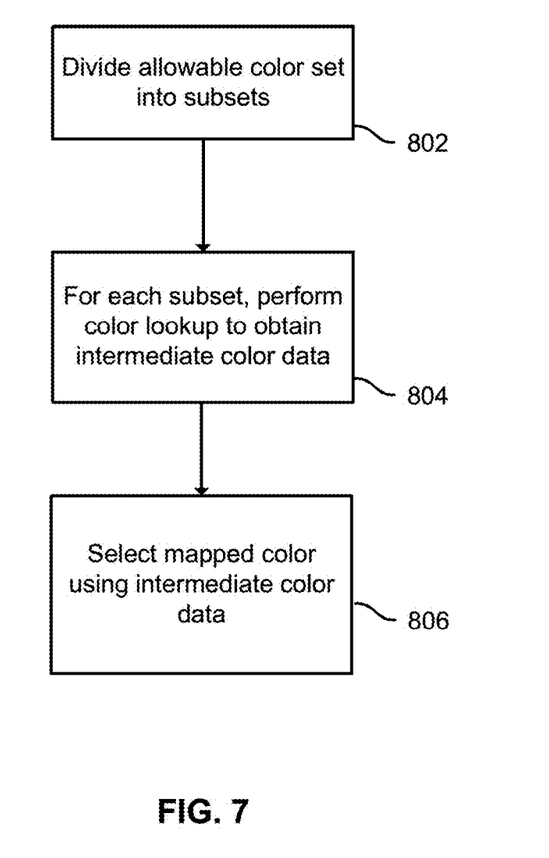
FIG. 7 is a flowchart illustrating an embodiment of a process for performing a color lookup using more than one stage.

FIG. 7 is a flowchart illustrating an embodiment of a process for performing a color lookup using more than one stage. In some embodiments, this process is performed by system 700. At 802, an allowed color set is divided into subsets. For example, a table corresponding to a color library is divided into multiple subtables. At 804, for each subset, a color lookup is performed to obtain intermediate color data. For example, the closest color to an initial color is looked up in each table. In some embodiments, 804 is performed by blocks 702-706. At 806, a mapped color is selected using the intermediate color data. For example, the closest colors resulting from 804 are placed in a candidate colors lookup table. The candidate colors lookup table is used to select the candidate that is the closest mapping or match, and the selected candidate is used as the mapped color. In some embodiments, 806 is performed by block 708.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method including:
    displaying a continuous spectrum of colors in a color selection interface, wherein colors of a color harmony are graphically identified based on a selection of a base color;
    mapping each color in the continuous spectrum of colors to an allowed color in an allowed color set to obtain a plurality of allowed colors;
    displaying the plurality of allowed colors in the color selection interface concurrently with the continuous spectrum of colors, the color selection interface comprising a plurality of discrete color segments each corresponding to one of the allowed colors, where placement of each discrete color segment reflects the color mapping between colors in the continuous spectrum of colors that mapped to each discrete color segment;
    graphically identifying colors in the plurality of allowed colors mapped to the colors of the color harmony; and
    upon selection of a different allowed color set, colors in the different allowed color set mapped to the colors of the color harmony are identified based on the base color.

2. A method as recited in claim 1, wherein the continuous spectrum of colors is continuous within a particular range of colors.

3. A method as recited in claim 1, wherein the plurality of allowed colors includes a discrete set of colors.

4. A method as recited in claim 1, wherein mapping includes determining a closest color to one or more colors in the continuous spectrum of colors.

5. A method as recited in claim 1, wherein the plurality of allowed colors is associated with a color library or a color theme.

6. A method as recited in claim 1, wherein the plurality of allowed colors is associated with a tag.

7. A method as recited in claim 1, wherein the continuous spectrum of colors is larger than the plurality of allowed colors.

8. A method as recited in claim 1, wherein mapping includes dividing a color lookup table into two or more subtables.

9. A method as recited in claim 1, wherein the continuous spectrum of colors is displayed using a color wheel, color grid, or color bar.

10. A method as recited in claim 1, wherein the plurality of allowed colors is displayed using a color wheel, color grid, or color bar.

11. A method as recited in claim 1, further including receiving an indication that a color from the plurality allowed of colors is selected.

12. The method of claim 1, wherein the colors in the color harmony are determined by a rule that defines a group of colors in terms of another color.

13. The method of claim 1, wherein the colors in the color harmony are determined by a rule that defines a group of colors in terms of relative positions on a color wheel, wherein the relative positions of adjacent colors form a fixed angle relative to a center of the color wheel.

14. The method of claim 1 wherein the discrete segments cover nonsymmetrical areas of the color selection interface.

15. The method of claim 1 wherein all colors in the continuous spectrum of colors are mapped to at least one discrete color segment.

16. A computer program product, the computer program product being embodied in a non-transitory computer readable storage medium and comprising computer instructions for:
    displaying a continuous spectrum of colors in a color selection interface, wherein colors of a color harmony are graphically identified based on a selection of a base color;
    mapping each color in the continuous spectrum of colors to an allowed color in an allowed color set to obtain a plurality of allowed colors;
    displaying the plurality of allowed colors in the color selection interface concurrently with the continuous spectrum of colors, the color selection interface comprising a plurality of discrete color segments each corresponding to one of the allowed colors, where placement of each discrete color segment reflects the color mapping between colors in the continuous spectrum of colors that mapped to each discrete color segment;
    graphically identifying colors in the plurality of allowed colors mapped to the colors of the color harmony; and
    upon selection of a different allowed color set, colors in the different allowed color set mapped to the colors of the color harmony are identified based on the base color.

17. A computer program product as recited in claim 16, wherein the plurality of allowed colors includes a continuous range of colors.

18. A computer program product as recited in claim 16, wherein the plurality of allowed colors is associated with a color library or color theme.

19. A system including:
    a processor; and
    a memory coupled with the processor, wherein the memory is configured to provide the processor with instructions which when executed cause the processor to:
        display a continuous spectrum of colors in a color selection interface, wherein colors of a color harmony are graphically identified based on a selection of a base color;
        map each color in the continuous spectrum of colors to an allowed color in an allowed color set to obtain a plurality of allowed colors;
        display the plurality of allowed colors in the color selection interface concurrently with the continuous spectrum of colors, the color selection interface comprising a plurality of discrete color segments each corresponding to one of the allowed colors, where placement of each discrete color segment reflects the color mapping between colors in the continuous spectrum of colors that mapped to each discrete color segment;
        graphically identifying colors in the plurality of allowed colors mapped to the colors of the color harmony; and
        upon selection of a different allowed color set, colors in the different allowed color set mapped to the colors of the color harmony are identified based on the base color.

20. A system as recited in claim 19, wherein the continuous spectrum of colors is continuous within a particular range of colors.

21. A system as recited in claim 19, wherein each discrete color segment is placed over a region corresponding to the color from which the allowed color was mapped.

22. A system as recited in claim 19, wherein multiple colors from the allowed color set can be selected at the same time.

23. A system as recited in claim 19, wherein only colors from the allowed set that are near or adjacent to a desired color are displayed.

* * * * *